(12) United States Patent
Asaie

(10) Patent No.: US 10,846,312 B2
(45) Date of Patent: Nov. 24, 2020

(54) SELECTION APPARATUS, SELECTION METHOD AND SELECTION PROGRAM

(71) Applicant: HITACHI, LTD., Tokyo (JP)

(72) Inventor: Machiko Asaie, Tokyo (JP)

(73) Assignee: HITACHI, LTD., Tokyo (JP)

( * ) Notice: Subject to any disclaimer, the term of this patent is extended or adjusted under 35 U.S.C. 154(b) by 302 days.

(21) Appl. No.: 16/083,943

(22) PCT Filed: Nov. 21, 2016

(86) PCT No.: PCT/JP2016/084489
§ 371 (c)(1),
(2) Date: Sep. 11, 2018

(87) PCT Pub. No.: WO2018/092317
PCT Pub. Date: May 24, 2018

(65) Prior Publication Data
US 2020/0293555 A1 Sep. 17, 2020

(51) Int. Cl.
G06F 16/28 (2019.01)
G06F 16/29 (2019.01)

(52) U.S. Cl.
CPC ............ *G06F 16/287* (2019.01); *G06F 16/29* (2019.01)

(58) Field of Classification Search
CPC .............................. G06F 16/287; G06F 16/29
USPC ........................................................ 707/738
See application file for complete search history.

(56) References Cited

U.S. PATENT DOCUMENTS

| 6,694,178 | B1* | 2/2004 | Soula | A61B 5/044 |
| | | | | 600/523 |
| 8,306,939 | B2* | 11/2012 | Kataoka | G01N 27/44717 |
| | | | | 706/52 |
| 2004/0218894 | A1* | 11/2004 | Harville | H04N 5/9201 |
| | | | | 386/241 |
| 2006/0242564 | A1* | 10/2006 | Egger | G06F 16/2228 |
| | | | | 715/210 |

(Continued)

FOREIGN PATENT DOCUMENTS

JP 2005-078186 A 3/2005

OTHER PUBLICATIONS

International Search Report, dated Jan. 10, 2017, which issued during the prosecution of International Application No. PCT/JP2016/084489, which corresponds to the present application.

(Continued)

*Primary Examiner* — Dung K Chau
(74) *Attorney, Agent, or Firm* — Baker Botts L.L.P.

(57) ABSTRACT

A selection apparatus selects a variable with a range of values of a data group from an observation target. The processor generates a plurality of clusters by clustering a representative data group representing the variable for each of a plurality of the data groups corresponding to a plurality of the variables based on similarity of the representative data group, generates a map by plotting the representative data group on a coordinate plane constituted by a first axis related to a first component and a second axis related to a second component, and selects, by selecting specific representative data from among one or more pieces of representative data belonging to each of the plurality of clusters, a specific variable represented by the specific representative data based on a circle having a center at an origin of the map.

9 Claims, 18 Drawing Sheets

(56) References Cited

U.S. PATENT DOCUMENTS

2013/0054603 A1* 2/2013 Birdwell .............. G06K 9/6253
707/738
2014/0297642 A1* 10/2014 Lum ................ G06F 16/90328
707/737
2018/0060150 A1* 3/2018 Cunico ............... G06F 11/0787

OTHER PUBLICATIONS

I. T. Jolliffe, "Principal Component Analysis, Second Edition," Springer, 2002.
J. R. King et al., " Variable Selection in Large Environmental Data Sets Using Principal Components Analysis," Environmetrics, 10, 67-77 (1999).

* cited by examiner

FIG. 3

105 ← M(=13) PIECES →

| X1 | X2 | X3 | X4 | X5 | X6 | X7 | X8 | X9 | X10 | X11 | X12 | X13 |
|---|---|---|---|---|---|---|---|---|---|---|---|---|
| 14.23 | 1.71 | 2.43 | 15.6 | 127 | 2.8 | 3.06 | 0.28 | 2.29 | 5.64 | 1.04 | 3.92 | 1065 |
| 13.2 | 1.78 | 2.14 | 11.2 | 100 | 2.65 | 2.76 | 0.26 | 1.28 | 4.38 | 1.05 | 3.4 | 1050 |
| 13.16 | 2.36 | 2.67 | 18.6 | 101 | 2.8 | 3.24 | 0.3 | 2.81 | 5.68 | 1.03 | 3.17 | 1185 |
| 14.37 | 1.95 | 2.5 | 16.8 | 113 | 3.85 | 3.49 | 0.24 | 2.18 | 7.8 | 0.86 | 3.45 | 1480 |
| 13.24 | 2.59 | 2.87 | 21 | 118 | 2.8 | 2.69 | 0.39 | 1.82 | 4.32 | 1.04 | 2.93 | 735 |
| 14.2 | 1.76 | 2.45 | 15.2 | 112 | 3.27 | 3.39 | 0.34 | 1.97 | 6.75 | 1.05 | 2.85 | 1450 |
| 14.39 | 1.87 | 2.45 | 14.6 | 96 | 2.5 | 2.52 | 0.3 | 1.98 | 5.25 | 1.02 | 3.58 | 1290 |
| 14.06 | 2.15 | 2.61 | 17.6 | 121 | 2.6 | 2.51 | 0.31 | 1.25 | 5.05 | 1.06 | 3.58 | 1295 |
| 14.83 | 1.64 | 2.17 | 14 | 97 | 2.8 | 2.98 | 0.29 | 1.98 | 5.2 | 1.08 | 2.85 | 1045 |
| 13.86 | 1.35 | 2.27 | 16 | 98 | 2.98 | 3.15 | 0.22 | 1.85 | 7.22 | 1.01 | 3.55 | 1045 |
| 14.1 | 2.16 | 2.3 | 18 | 105 | 2.95 | 3.32 | 0.22 | 2.38 | 5.75 | 1.25 | 3.17 | 1510 |
| ... | ... | ... | ... | ... | ... | ... | ... | ... | ... | ... | ... | ... |
| 13.88 | 1.89 | 2.59 | 15 | 101 | 3.25 | 3.56 | 0.17 | 1.7 | 5.43 | 0.88 | 3.56 | 1095 |
| 13.24 | 3.98 | 2.29 | 17.5 | 103 | 2.64 | 2.63 | 0.32 | 1.66 | 4.36 | 0.82 | 3 | 680 |
| 13.05 | 1.77 | 2.1 | 17 | 107 | 3 | 3 | 0.28 | 2.03 | 5.04 | 0.88 | 3.35 | 885 |
| 14.21 | 4.04 | 2.44 | 18.9 | 111 | 2.85 | 2.65 | 0.3 | 1.25 | 5.24 | 0.87 | 3.33 | 1080 |
| 14.38 | 3.59 | 2.28 | 16 | 102 | 3.25 | 3.17 | 0.27 | 2.19 | 4.9 | 1.04 | 3.44 | 1065 |
| 13.9 | 1.68 | 2.12 | 16 | 101 | 3.1 | 3.39 | 0.21 | 2.14 | 6.1 | 0.91 | 3.33 | 985 |
| 14.1 | 2.02 | 2.4 | 18.8 | 103 | 2.75 | 2.92 | 0.32 | 2.38 | 6.2 | 1.07 | 2.75 | 1060 |
| 13.94 | 1.73 | 2.27 | 17.4 | 108 | 2.88 | 3.54 | 0.32 | 2.08 | 8.9 | 1.12 | 3.1 | 1260 |
| 13.05 | 1.73 | 2.04 | 12.4 | 92 | 2.72 | 3.27 | 0.17 | 2.91 | 7.2 | 1.12 | 2.91 | 1150 |
| 13.83 | 1.65 | 2.6 | 17.2 | 94 | 2.45 | 2.99 | 0.22 | 2.29 | 5.6 | 1.24 | 3.37 | 1265 |
| 13.82 | 1.75 | 2.42 | 14 | 111 | 3.88 | 3.74 | 0.32 | 1.87 | 7.05 | 1.01 | 3.26 | 1190 |
| 13.77 | 1.9 | 2.68 | 17.1 | 115 | 3 | 2.79 | 0.39 | 1.68 | 6.3 | 1.13 | 2.93 | 1375 |
| 13.74 | 1.67 | 2.25 | 16.4 | 118 | 2.6 | 2.9 | 0.21 | 1.62 | 5.85 | 0.92 | 3.2 | 1060 |
| 13.56 | 1.73 | 2.46 | 20.5 | 116 | 2.96 | 2.78 | 0.2 | 2.45 | 6.25 | 0.98 | 3.03 | 1120 |
| 14.22 | 1.7 | 2.3 | 16.3 | 118 | 3.2 | 3 | 0.26 | 2.03 | 6.38 | 0.94 | 3.31 | 970 |
| 13.29 | 1.97 | 2.68 | 16.8 | 102 | 3 | 3.23 | 0.31 | 1.66 | 6 | 1.07 | 2.84 | 1270 |
| 13.72 | 1.43 | 2.5 | 16.7 | 108 | 3.4 | 3.67 | 0.19 | 2.04 | 6.6 | 0.89 | 2.87 | 1285 |

N PIECES (vertical label on left)

FIG. 4

106:
VARIABLE SELECTION CONDITIONS
(1) NUMBER OF SELECTIONS P (P < M)
(2) CUMULATIVE-CONTRIBUTION-RATE REFERENCE VALUE C%
(3) LOADING-DETERMINATION REFERENCE VALUE
(4) NUMBER OF CLUSTERS K
(5) LABEL DESIGNATION TABLE
(6) DESIGNATED-VARIABLE TABLE

FIG. 9

PRINCIPAL-COMPONENT ANALYSIS RESULT (730)

| | PC1 | PC2 | PC3 | PC4 | PC5 | PC6 | PC7 | PC8 | PC9 | PC10 | PC11 | PC12 | PC13 |
|---|---|---|---|---|---|---|---|---|---|---|---|---|---|
| PRINCIPAL COMPONENT EIGENVALUE | 3.644 | 2.371 | 1.860 | 0.944 | 0.867 | 0.846 | 0.682 | 0.520 | 0.418 | 0.310 | 0.245 | 0.183 | 0.109 |
| CONTRIBUTION RATE | 0.280 | 0.182 | 0.143 | 0.073 | 0.067 | 0.065 | 0.052 | 0.040 | 0.032 | 0.024 | 0.019 | 0.014 | 0.008 |
| CUMULATIVE CONTRIBUTION RATE | 0.280 | 0.463 | 0.606 | 0.678 | 0.745 | 0.810 | 0.863 | 0.903 | 0.935 | 0.959 | 0.978 | 0.992 | 1.000 |

| variables | PC1 | PC2 | PC3 | PC4 | PC5 | PC6 | PC7 | PC8 | PC9 | PC10 | PC11 | PC12 | PC13 |
|---|---|---|---|---|---|---|---|---|---|---|---|---|---|
| X1 | -0.326 | -0.014 | 0.078 | -0.568 | 0.249 | -0.217 | 0.357 | -0.165 | 0.356 | -0.339 | 0.207 | 0.127 | 0.026 |
| X2 | 0.083 | 0.475 | 0.125 | -0.297 | 0.068 | -0.328 | -0.396 | 0.169 | 0.294 | 0.354 | -0.316 | 0.179 | -0.149 |
| X3 | -0.035 | 0.447 | -0.321 | -0.375 | -0.228 | 0.035 | 0.104 | -0.015 | -0.405 | 0.281 | 0.399 | -0.143 | 0.260 |
| X4 | -0.409 | -0.019 | 0.330 | 0.106 | 0.060 | 0.018 | -0.220 | 0.336 | 0.181 | 0.053 | 0.069 | -0.398 | 0.590 |
| X5 | -0.461 | 0.019 | 0.139 | 0.127 | -0.166 | -0.037 | -0.182 | 0.226 | -0.058 | 0.033 | 0.468 | -0.008 | -0.644 |
| X6 | -0.454 | 0.067 | 0.055 | 0.253 | 0.097 | 0.089 | 0.093 | -0.174 | -0.160 | 0.281 | -0.073 | 0.705 | 0.233 |
| X7 | -0.320 | 0.235 | -0.271 | 0.139 | 0.316 | 0.079 | 0.470 | 0.180 | -0.029 | 0.150 | -0.424 | -0.356 | -0.244 |
| X8 | 0.162 | -0.256 | 0.310 | 0.070 | 0.040 | -0.686 | 0.361 | 0.138 | 0.031 | 0.290 | 0.064 | -0.040 | 0.023 |
| X9 | -0.313 | -0.052 | 0.006 | -0.061 | -0.769 | -0.209 | 0.061 | -0.249 | 0.040 | -0.100 | -0.414 | -0.113 | 0.010 |
| X10 | 0.061 | -0.357 | 0.256 | -0.440 | -0.183 | 0.505 | 0.220 | 0.314 | -0.370 | 0.373 | -0.121 | 0.103 | -0.092 |
| X11 | 0.126 | 0.428 | 0.350 | 0.035 | -0.136 | 0.090 | 0.205 | 0.429 | 0.526 | -0.539 | -0.118 | 0.215 | 0.037 |
| X12 | 0.228 | 0.331 | 0.242 | 0.341 | -0.224 | 0.118 | 0.398 | -0.194 | -0.336 | 0.223 | 0.272 | -0.054 | -0.001 |
| X13 | -0.040 | 0.158 | 0.573 | -0.125 | 0.215 | 0.193 | -0.106 | -0.562 | -0.336 | 0.042 | -0.101 | -0.274 | -0.141 |

FIG. 15

| variable | attribute | Cluster | Essential | Preferred | Recommended | Selected |
|---|---|---|---|---|---|---|
| X1 | temperature of A | 4 | ✓ |  |  | ✓ |
| X2 | temperature of B | 2 | ✓ | ✓ | ✓ | ✓ |
| X3 |  | 1 |  |  |  |  |
| X4 | Electric Power 1 | 1 | ✓ | ✓ |  | ✓ |
| X5 | Electric Power 2 | 1 |  | ✓ | ✓ |  |
| X6 |  | 5 |  |  |  |  |
| X7 | Electric Voltage | 5 | ✓ | ✓ | ✓ | ✓ |
| X8 |  | 3 |  |  | ✓ |  |
| X9 |  | 5 |  |  |  |  |
| X10 |  | 5 |  |  |  |  |
| X11 |  | 3 |  |  |  |  |
| X12 |  | 2 |  |  |  |  |
| X13 |  | 4 |  |  |  |  |

▶ : FILTERING BUTTON

FIG. 17

| variable 501 ▶ | attribute 502 ▶ | Cluster 1000 ▶ | Essential 603 ▶ | Preferred 503 ▶ | Recommended 1501 ▶ | Selected 1502 ▶ |
|---|---|---|---|---|---|---|
| X3 | Electric Power 1 | 1 | ✓ | ✓ | | |
| X4 | Electric Power 2 | 1 | | ✓ | ✓ | ✓ |
| ... | ... | 1 | ... | ... | | |

▶ : FILTERING BUTTON

1500

SELECTION APPARATUS, SELECTION METHOD AND SELECTION PROGRAM

CROSS REFERENCE TO PRIOR APPLICATIONS

This application is a U.S. National Phase application under 35 U.S.C. § 371 of International Application No. PCT/JP2016/084489, filed on Nov. 21, 2016. The International Application was published in Japanese on May 24, 2018 as WO 2018/092317 A1 under PCT Article 21(2). The contents of the above application are hereby incorporated by reference.

TECHNICAL FIELD

The present invention relates to a selection apparatus, a selection method, and a selection program that select variables.

BACKGROUND ART

In many manufacturing industries, operation data of mechanical apparatuses are acquired and monitored, and defects of the mechanical apparatus and their impact on product quality are analyzed to take preventive maintenance and quality improvement measures. A large number of sensor groups of several thousands to several tens of thousands monitor operation data. However, it is difficult to automatically extract, from among these sensors, a small number of sensor groups for temperature and speed directly or indirectly affecting quality, and to determine a control range such as a temperature condition. In addition, since monitoring by a large number of sensor groups increases the communication load and the analysis processing/monitoring load on a monitoring server, there is a demand to minimize the monitoring sensors.

Principal component analysis (PCA) has been utilized as a conventional method for expressing multivariable observation values in low dimensions. In the principal component analysis disclosed in NPL 1, multivariable observation values are converted into a principal component space in which the dimensions are reduced from the total number of monitoring sensors M to M' (M>M', M>0, M'>0) by dimensionality compression, and the data is expressed in less dimensions. Principal component analysis is a method for reducing multidimensional data to low dimensional data without losing its information as much as possible. That is, data having M variables is converted into M' (M>M') principal components.

NPL 2 discloses a method for selecting a representative variable of each principal component. Specifically, in NPL 2, when the number of principal components to be adopted is Q (Q<M) by performing principal component analysis of the data having a variable M and the number of records N, p variables are selected using a method for evaluating, in the order from the principal component having the largest eigenvalue, the eigenvector corresponding to each principal component and leaving the variable having the largest coefficient among the eigenvectors.

PTL 1 discloses a multivariate data selection apparatus capable of selecting a variate reflecting the data structure of the entire variates. The multivariate data selection apparatus calculates angles between the eigenvector planes generated by principal component analysis of data having m variables and the orthonormal basis planes which is the combinations of mCp selecting the number of variable selections p from all variables n, and adopts the combination of variables having the smallest angle.

CITATION LIST

Patent Literature

PTL 1: JP 2005-78186 A

Non-Patent Literature

NPL 1: Jolliffe I. T, "Principal Component Analysis, second Edition", Springer, 2002

NPL 2: KING J R, et al., "VARIABLE SELECTION IN LARGE ENVIRONMENTAL DATA SETS USING PRINCIPAL COMPONENTS ANALYSIS", Environmetrics, 10, 67-77 (1999)

SUMMARY OF INVENTION

Technical Problem

However, in NPL 1, observation values are converted into abstract values in a newly defined principal component space, and the interpretation of the principal component axes depends on an analyst's skill or business knowledge. The principal component is obtained by calculating the eigenvector from the correlation matrix of the original data. In this manner, it is necessary for an analyst to interpret what kind of characteristics the principal component has and the characteristics of what variable it inherits. To interpret what kind of meaning of axis the principal component axis has been converted into in comparison with the original data, a huge amount of labor is required to select several tens to hundreds of sensors representing data characteristics from a large number of sensor groups of several thousands to several tens of thousands, and a mechanical extraction method is needed.

Furthermore, in the principal component analysis in NPL 1, the variable selection standard is changed depending on the purpose of analysis. Thus, it is required to perform further trial-and-error analysis such as machine learning as to whether the selected variable group is appropriate.

In NPL 2, Q variables that are sufficiently small for the variable M are selected for each principal component, but when a large number of variables are targeted, redundant variables indicating similar observation value behavior can be highly selected.

PTL 1 discloses a variable selection apparatus using principal component analysis, but all variable combinations are calculated and compared with principal components constituted by the original data. Thus, when the number of variables is several thousand levels or more, calculating all variable combinations requires huge computer resources and huge calculation time.

As described above, with the conventional method, redundant variables similar to the case of large variables can be selected. In addition, the experience knowledge of analysts and workers at the manufacture site is not reflected, and it is difficult to evaluate the validity of the selected variables.

The present invention is to easily and appropriately select variables.

Solution to Problem

A selection apparatus, a selection method, and a selection program according to one aspect of the invention disclosed in the present application are a selection apparatus, a selection method, and a selection program that select a variable which is a range of possible values of a data group from an observation target, the apparatus including a processor that executes a program and a storage device that stores the program, in which the processor generates a plurality of clusters by clustering a representative data group representing the variable for each of a plurality of the data groups corresponding to a plurality of the variables based on similarity of the representative data group, generates a map by plotting the representative data group on a coordinate plane constituted by a first axis related to a first component defining a first characteristic of each piece of data of the representative data group and a second axis related to a second component defining a second characteristic, and selects, by selecting specific representative data from among one or more pieces of representative data belonging to each of the plurality of clusters, a specific variable represented by the specific representative data based on a circle having a center at an origin of the map.

Advantageous Effects of Invention

According to the representative embodiment of the present invention, it is possible to easily and appropriately select variables. Problems, configurations, and effects other than those described above will be clarified from the description of the following embodiment.

BRIEF DESCRIPTION OF DRAWINGS

FIG. 3 is an explanatory diagram showing an example of input data groups shown in FIG. 1.

FIG. 4 is an explanatory diagram showing an example of variable selection conditions shown in FIG. 1.

FIG. 9 is an explanatory diagram showing an example of a principal-component analysis result.

FIG. 15 is an explanatory diagram showing an example of a variable-selection-result output screen.

FIG. 17 is an explanatory diagram showing another example of the variable-selection-result output screen.

DESCRIPTION OF EMBODIMENT

Example of System Configuration of Selection System

Figure 1:
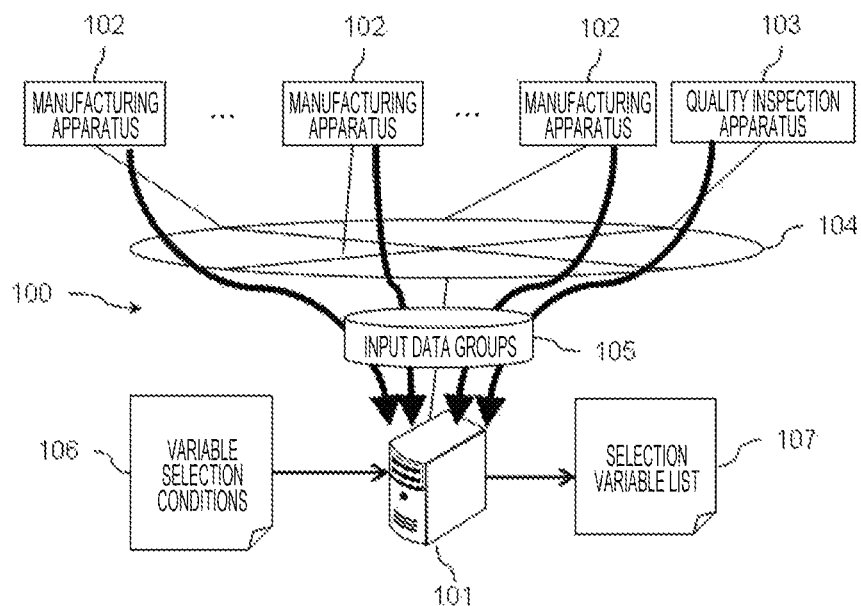
FIG. 1 is a block diagram showing an example of a hardware configuration of a selection system.

FIG. 1 is a block diagram showing an example of a hardware configuration of a selection system. A selection system 100 includes one or more manufacturing apparatuses 102, one or more quality inspection apparatuses 103, and a selection apparatus 101. Both the selection apparatus 101 and one or more manufacturing apparatuses 102 are observation targets of the selection apparatus and are communicably connected via a network 104. The selection apparatus 101 and one or more quality inspection apparatuses 103 are communicably connected via the network 104. One or more quality inspection apparatus 103 and one or more quality inspection apparatuses 103 constitute a manufacturing line of a manufacturing industry.

In the present embodiment, when one manufacturing apparatus 102 or one quality inspection apparatus 103 is an observation target, the observation target corresponds to one variable for convenience of explanation. However, one observation target may correspond to a plurality of variables. In addition, a plurality of observation targets may exist in one apparatus (one manufacturing apparatus 102 or one quality inspection apparatus 103).

The selection apparatus 101 is an apparatus that selects a variable that is a range of possible values of a data group from an observation target. The selection apparatus 101 acquires operation log data from one or more manufacturing apparatuses 102 and quality-inspection result data of products manufactured by the manufacturing apparatuses 102 from one or more quality inspection apparatuses 103 as input data groups 105 in, for example, the production line. The selection apparatus 101 further sets variable selection conditions 106. Then, the selection apparatus 101 outputs a selection variable list 107 selected from variable groups for principal component analysis to detect an abnormality of the apparatuses and products. In this manner, the selection apparatus 101 efficiently selects an appropriate variable group from a large number of variable groups obtained by principal component analysis.

Figure 2:
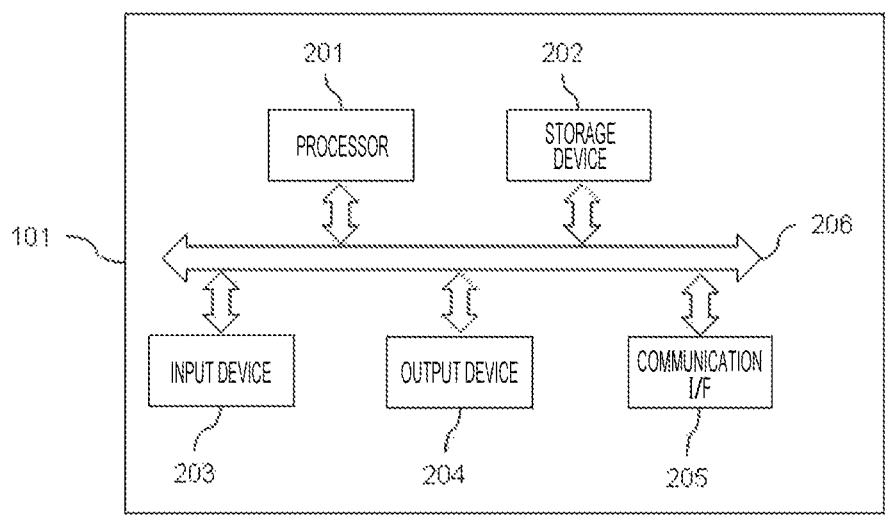
FIG. 2 is a block diagram showing an example of a hardware configuration of a selection apparatus.

FIG. 2 is a block diagram showing an example of a hardware configuration of the selection apparatus 101. The selection apparatus 101 includes a processor 201, a storage device 202, an input device 203, an output device 204, and a communication interface (communication IF) 205. The processor 201, the storage device 202, the input device 203, the output device 204, and the communication IF 205 are connected by a bus 206. The processor 201 controls the selection apparatus 101. The storage device 202 serves as a work area of the processor 201. The storage device 202 is a non-transitory or transitory recording medium that stores various programs and data. As the storage device 202, a read only memory (ROM), a random access memory (RAM), and a hard disk drive (HDD) are used for example. The input device 203 inputs data. As the input device 203, a keyboard, a mouse, a touch panel, a numeric keypad, and a scanner are used for example. The output device 204 outputs data. As the output device 204, a display and a printer are used for example. The communication IF 205 is connected to the network 104, and transmits and receives data.

FIG. 3 is an explanatory diagram showing an example of the input data groups 105 shown in FIG. 1. The input data groups 105 are sets of M×N pieces of data. X1 to X13 are M=13 variables. M (an integer of M>1) is the number of variables. N (an integer of N>1) is the number of data groups of X1 to X13 variables. Here, as an example, the input data groups 105 show operation log data and quality-inspection result data obtained in time series from twelve manufacturing apparatuses 102 and one quality inspection apparatus 103.

FIG. 4 is an explanatory diagram showing an example of the variable selection conditions 106 shown in FIG. 1. The variable selection conditions 106 are conditions for the selection apparatus 101 to efficiently select an appropriate variable group from a large number of variable groups obtained by principal component analysis. The variable selection conditions 106 include, for example, (1) the number of selections P (0<P<M), (2) a cumulative-contribution-rate reference value C %, (3) a loading-determination reference value, (4) the number of clusters K, (5) a label designation table, and (6) a designated-variable table.

(1) The number of selections P (<M) is the number of variables to be selected by the selection apparatus 101. (2) The cumulative-contribution-rate reference value C % is a threshold for determining the number of principal components, and is a value indicating what rate of the data is represented by the principal component. For example, the cumulative-contribution-rate reference value is usually designated as a value of C=70% to 80% or more. Instead of the cumulative-contribution-rate reference value, a threshold of an eigenvalue may be designated. Since data is scaled by a data normalizing processing unit 701 in FIG. 7 to be described later so that variance is to be 1, when an eigenvalue is less than 1, that is, when the variance becomes smaller than the original variance, the principal component is meaningless. Thus, it may be designated that the principal component having an eigenvalue less than 1 is not adopted.

The loading-determination reference value is a threshold when a factor-loading analysis unit 705 in FIG. 7 to be described later selects a variable. The factor-loading analysis unit 705 selects a variable indicating a value greater than the loading-determination reference value. The number of clusters K is the number of clusters designated when an eigenvector analysis unit 704 in FIG. 6 to be described later clusters variables.

The label designation table is table data for designating the selection priority order of a plurality of variables selected under the same conditions. The designated-variable table is table data for designating an item that is a pair of a variable to be monitored and its attribute based on knowledge of experienced administrators and technicians.

Figure 5:
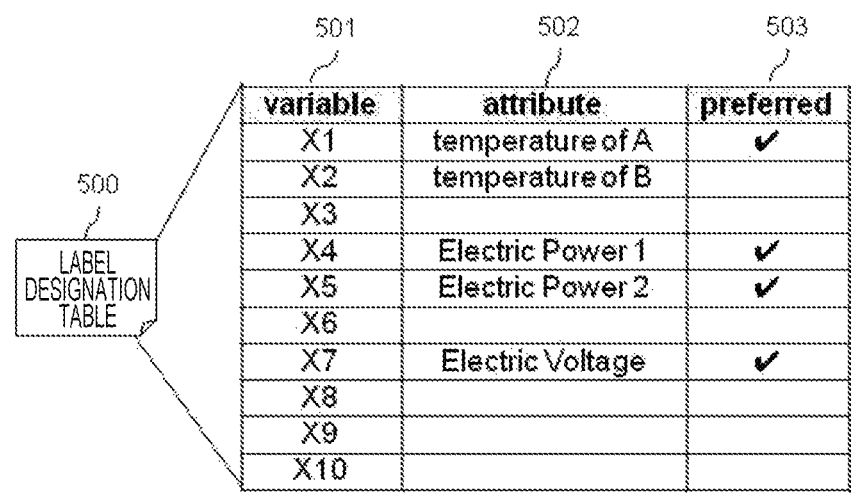
FIG. 5 is an explanatory diagram showing an example of a label designation table shown in FIG. 4.

FIG. 5 is an explanatory diagram showing an example of the label designation table shown in FIG. 4. A label designation table 500 includes a variable (variable) 501, a variable attribute (attribute) 502, and a priority label (preferred) 503. The variable 501 stores the index of a variable. The variable attribute 502 stores the attribute of a variable. The priority label 503 stores a label indicating whether to prioritize a variable. The priority label 503 is set through input device 203. For example, the variable attribute 502 of the variable X1 is "the temperature of the monitoring target A", and the priority label 503 is added thereto. For example, the temperature A is designated for business reasons such as being easily measured with low cost or being easily controlled. The label designation table 500 is used by a label determination unit 706 in FIG. 7 to be described later to preferentially select a priority label factor.

Figure 6:
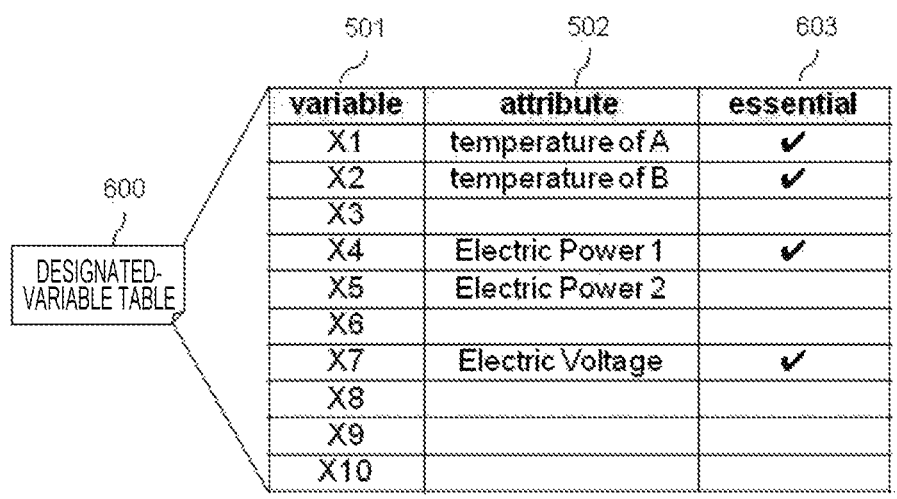
FIG. 6 is an explanatory diagram showing an example of a designated-variable table shown in FIG. 4.

FIG. 6 is an explanatory diagram showing an example of the designated-variable table shown in FIG. 4. A designated-variable table 700 includes a variable (variable) 501, a variable attribute (attribute) 502, and a designation label (essential) 603. The designation label 603 stores a label indicating whether to designate a variable. The designation label 603 is set through the input device 203. For example, the variable attribute 502 of the variable X1 is "the temperature of the monitoring target A", and the designation label 603 is added thereto. In the designated-variable table 700, an item defined for the business is designated as an item (a pair of the variable 501 and the variable attribute 502) to be monitored to detect an abnormality based on the manufacturing mechanism. Alternatively, when the configuration of the manufacturing apparatus 102 or the quality inspection apparatus 103 is changed, or when it is necessary to newly select a monitoring parameter due to addition of a monitoring target, an item having been monitored may be designated. The designated-variable table 600 is used by a variable determination unit 707 in FIG. 7 to be described later to calculate the agreement rate with a variable group selected by a variable selection unit 708.

Example of Functional Configuration of Selection Apparatus 101

Figure 7:
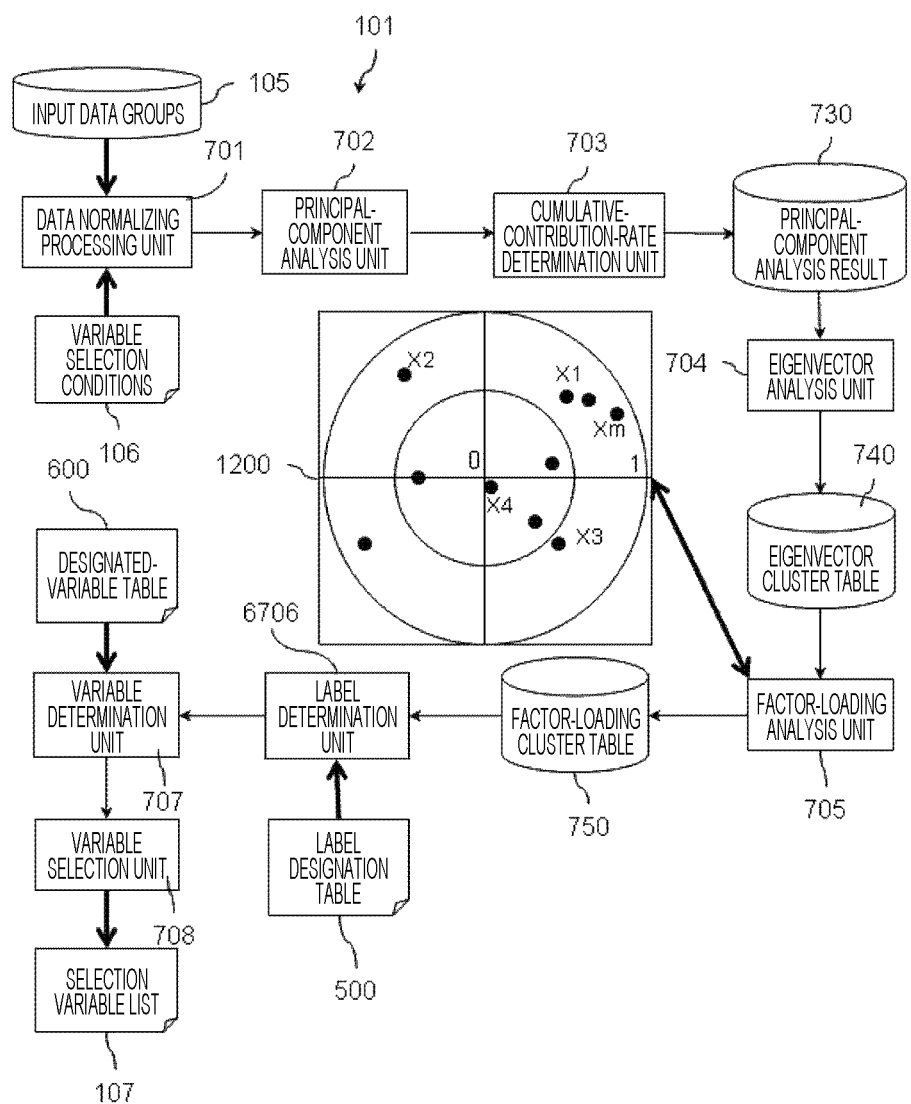
FIG. 7 is a block diagram showing an example of a functional configuration of the selection apparatus.

FIG. 7 is a block diagram showing an example of a functional configuration of the selection apparatus 101. The selection apparatus 101 includes a data normalizing processing unit 701, a principal-component analysis unit 702, a cumulative-contribution-rate determination unit 703, an eigenvector analysis unit 704, a factor-loading analysis unit 705, a label determination unit 706, a variable determination unit 707, and a variable selection unit 708. Specifically, these are functions implemented by, for example, causing the processor 201 to execute programs stored in the storage device 202 shown in FIG. 1.

The data normalizing processing unit 701 performs data normalizing processing. Specifically, the data normalizing processing unit 701 normalizes, for example, the M×N input data groups 105 to data having the variance of 1 and the average of 0. The normalized input data groups 105 are referred to as first input data groups 105.

The principal-component analysis unit 702 performs principal component analysis using the first input data groups 105 normalized by the data normalizing processing unit 701, and outputs a principal-component analysis result.

The cumulative-contribution-rate determination unit 703 performs cumulative-contribution-rate determination. Specifically, the cumulative-contribution-rate determination unit 703 selects, for example, upper M' principal components indicating the cumulative contribution rate C %.

Figure 8:
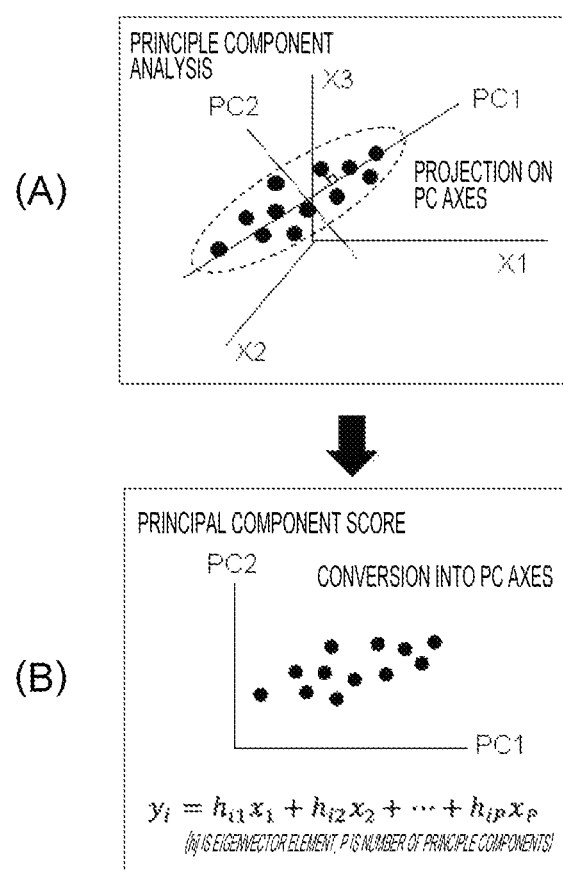
FIG. 8 is an explanatory diagram showing an example of principal component analysis.

FIG. 8 is an explanatory diagram showing an example of principal component analysis. (A) shows the input data groups 105 as three-dimensional data of three variables of X1, X2, and X3. The principal-component analysis unit 702 defines, in data sets, a first principal component (PC1) in the direction of the largest variance, and sets the straight line indicating the largest variance among straight lines perpendicularly intersecting the straight line as a second principal component (PC2), and defines a third principal component, a fourth principal component, . . . in the same manner. The principal-component analysis unit 702 reflects the characteristics of the input data groups 105 in the order from the first principal component. (B) shows a plotted principal component score obtained by converting data on new axes PC1 and PC2 defined by the principal component analysis.

FIG. 9 is an explanatory diagram showing an example of a principal-component analysis result. A principal-component analysis result 730 includes an eigenvalue table 901 and an eigenvector table 902. The eigenvalue table 901 includes a principal component 911, an eigenvalue 912, a contribution rate 913, and a cumulative contribution rate 914. The eigenvalue 912 is the information amount of each principal component 911. Here, the principal component 911 is named as a first principal component (PC1), a second principal component (PC2), . . . , a thirteenth principal component (PC13) in descending order of the eigenvalues 912. The contribution rate 913 indicates the rate of the principal component 911 to the total data. Specifically, for example, the contribution rate 913 is a value obtained by dividing the eigenvalue 912 of the principal component 911 by the sum of the eigenvalues 912.

The cumulative contribution rate 914 is a value obtained by accumulating the contribution rates 913 in the order from the principal component 911 having the largest eigenvalue 912. For example, the principal components 911 up to the cumulative contribution rate 914 indicating 70% to 80% of the whole are normally adopted to be the reduced number of dimensions. For example, in the example of the eigenvalue table 901, the principal components 911 up to the fifth principal component the cumulative contribution rate 914 of which exceeds 70% are adopted, and the input data groups 105 are to be data groups dimensionally compressed from the M=13 dimensions of the first input data groups 105 to the M'=5 dimensional space after the principal component analysis.

The eigenvector table 902 stores eigenvectors 921 to 9213 of the principal components PC1 to CP13 respectively. The eigenvectors are calculated from the correlation matrix of the first input data groups 105. The magnitude of the absolute value of each element of the eigenvector represents the magnitude of the contribution of the variable to the principal component 911. The characteristic of the principal component 911 indicates that the eigenvector-element absolute value has a characteristic of a variable having a large absolute value and the correlation between variables having large eigenvector-element absolute values is high. For example, the variables X4 (−0.409), X5 (−0.461), and X6 (0.454) having large absolute values among the eigenvectors 921 of the first principal component PC1 contribute to the characteristic of the first principal component PC1.

The eigenvector analysis unit 704 performs eigenvector analysis. Specifically, for example, the eigenvector analysis unit 704 analyzes the eigenvector group of the eigenvector table 902 and clusters the eigenvector group. The eigenvector analysis unit 704 performs clustering using, for example, the number of clusters K of the variable selection conditions 106 by the k-means clustering method.

Figure 10:
FIG. 10 is an explanatory diagram showing an eigenvector cluster table clustered by an eigenvector analysis unit.

FIG. 10 is an explanatory diagram showing an eigenvector cluster table 740 clustered by the eigenvector analysis unit 704. The eigenvector cluster table 740 includes a data group obtained by extracting the variables 501 and the eigenvectors 921 to 925 of the first principal component PC1 to the fifth principal component PC5 from the eigenvector table 902 by the cumulative-contribution-rate determination unit 703. The eigenvector cluster table 740 further includes cluster numbers (cluster) 1000 clustered with elements of eigenvectors.

The eigenvector analysis unit 704 performing classification with the eigenvectors of the variables X1 to X13 (the values of the first principal component PC1 to the fifth principal component PC5) and the number of clusters K=5 of the variable selection conditions 106 by the K-means clustering method. Thus, for example, the variables X1, X8, and X11 are classified in the cluster number 1 and can be said that the variables have similar characteristics. Similarly, the variables X6, X7, X19, and X13 are classified in the cluster number 2.

The factor-loading analysis unit 705 performs factor loading analysis. Specifically, for example, the factor-loading analysis unit 705 selects a variable having a large loading determination index from each cluster. Specifically, for example, the factor-loading analysis unit 705 calculates the factor loading by normalizing the value of the eigenvector of the eigenvector cluster table 740 shown in FIG. 10.

Figure 11:
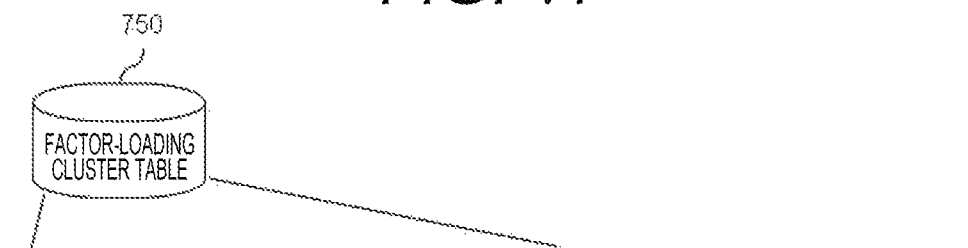
FIG. 11 is an explanatory diagram showing an example of a factor-loading cluster table.

FIG. 11 is an explanatory diagram showing an example of a factor-loading cluster table. A factor-loading cluster table 750 includes the variable 501, factor loadings 1101 to 1105 of the first principal component PC1 to the fifth principal component PC5 in the input data groups 105, a first maximum value 1111, a second maximum value 1112, and the cluster number 1000. The first maximum value 1111 is a value which is the maximum absolute value among the factor loadings of the same variable. The second maximum value 1112 is a value which is the second maximum absolute value among the factor loadings of the same variable.

The factor loading is used to consider which variable each principal component is deeply related to. The factor loading is calculated by the following formula and equivalent to the correlation coefficient between the variable Xi and the principal component axis PCj.

$$\text{Factor loading } Cor(X_i, y_j) = \sqrt{l_j} * h_{ij} \qquad \text{[Mathematical Formula 1]}$$

Where $$\begin{pmatrix} h_{1j} \\ h_{2j} \\ h_{mj} \end{pmatrix}$$

is the eigenvector of PCj (1≤j≤m; m is the number of variables)

$l_j$ the j-th eigenvalue

Figure 12:
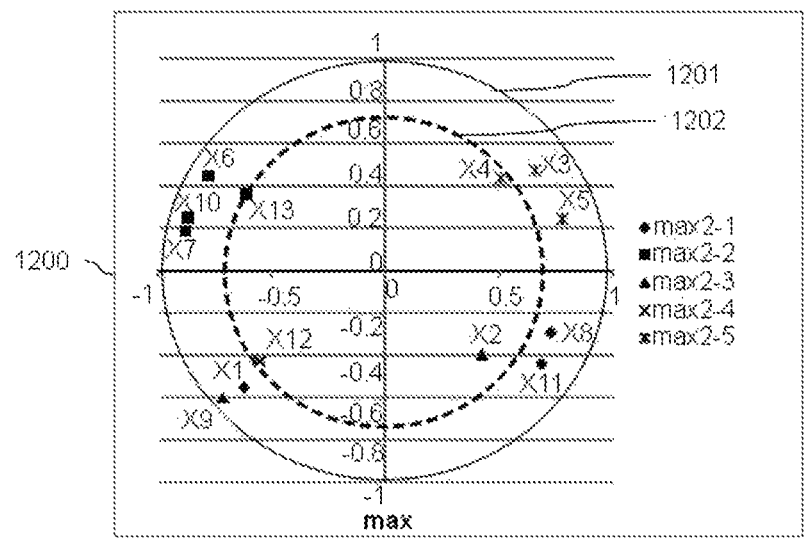
FIG. 12 is an explanatory diagram showing an example of a factor loading map.

FIG. 12 is an explanatory diagram showing an example of a factor loading map. A factor loading map 1200 is a map obtained by setting the first maximum values 1111 calculated in FIG. 11 as the horizontal axis and the second maximum values 1112 as the vertical axis and plotting the variables in a circle 1201 having a radius of 1. An inner broken-line circle 1202 equivalents to a loading determination index threshold. The distance from the origin (0, 0) to each of the variables X1 to X13 is the loading determination index. X1 to X13 indicate variables and are classified by color into five clusters.

When it is assumed that the load determination index for the variable Xi is d(Xi), the maximum value of loading is max(i), and the second maximum loading is max2(i), the load determination index d(Xi) is expressed by the following formula.

$$\text{Load determination index } d(Xi) = \sqrt{(\max(i))^2 + \max2(i)^2}$$

Figure 13:
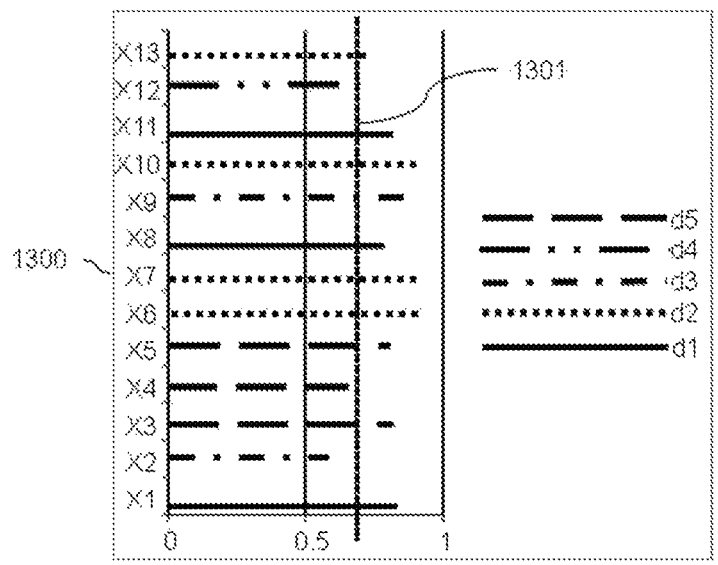
FIG. 13 is an explanatory diagram showing an example of a graph showing a load determination index of each variable shown in FIG. 12.

FIG. 13 is an explanatory diagram showing an example of a graph showing the load determination index dk (k is the cluster number) of each of the variables X1 to X13 shown in FIG. 12. In a graph 1300, the load determination indexes d1 to d5 are the distances from the origin (0, 0) of the factor loading map 1200 to the variables X1 to X13 belonging to the corresponding clusters. A broken line 1301 is the loading determination index threshold. When the factor loading map 1200 in FIG. 12 and the graph 1300 in FIG. 13 are displayed on the display screen, by enlarging or reducing the broken-line circle 1202 of the factor loading map 1200 with the input device 203, the broken line 1301 of the graph 1300 also moves to the left or right in conjunction with the enlargement or the reduction. Conversely, by moving the broken line 1301 of the graph 1300 with the input device 203, the broken-line circle 1202 of the factor loading map 1200 is also enlarged or reduced in conjunction with the movement.

Figure 14:
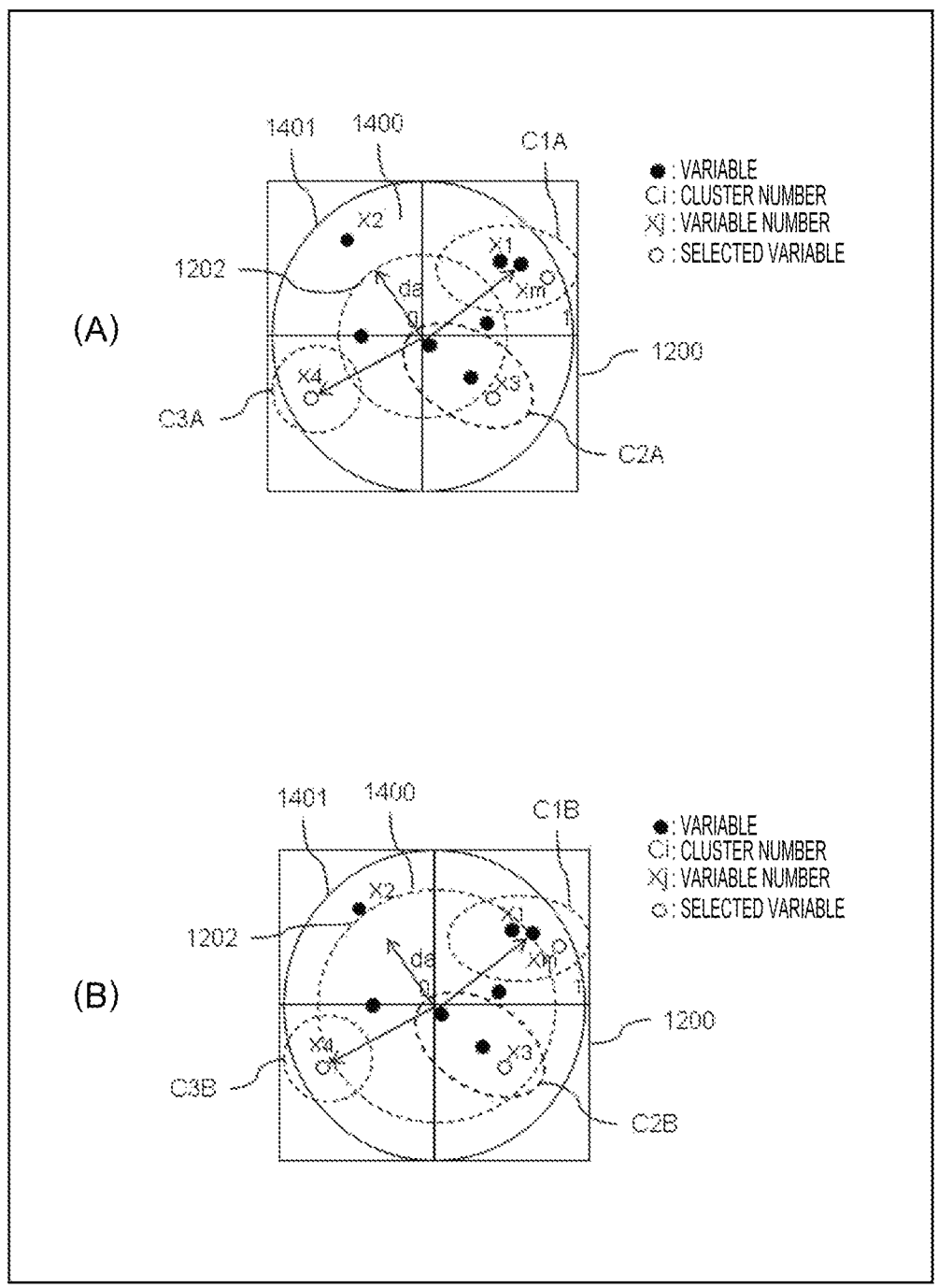
FIG. 14 is an explanatory diagram showing a relationship between a cluster and a loading determination index threshold.

FIG. 14 is an explanatory diagram showing a relationship between a cluster and a loading determination index threshold. In the factor loading map 1200 in (A), the radius da (0<da<1) of the broken-line circle 1202 is set as the inner circle, and an annular region 1400 is set between the broken-line circle 1202 and an outer circle 1401 having a radius of 1. C1A to C3A are clusters. The factor-loading analysis unit 705 selects the outermost variable among the variables existing in the annular region 1400. The reason for selecting the outermost variable is that it has a high contribution to the principal component. The factor-loading analysis unit 705 selects, from the cluster C1, the outermost variable Xm farthest from the origin (0, 0) of the factor loading map 1200. Similarly, the factor-loading analysis unit 705 selects the variable X3 from the cluster C2 and the variable X4 from the cluster C3.

To select a variable having a higher contribution to the principal component, as shown in (B), the radius da is changed by, for example, the user operation so as to be increased in the factor loading map 1200. This reduces the area of the annular region 1400 between the outer circle 1401 and the broken-line circle 1202, and the number of variables existing in the annular region 1400 is reduced. For example, the cluster C2A in (A) becomes a cluster C2B in (B), and the variable X3 existing at the outermost side in this cluster C2B is also out of the annular region 1400.

In this case, the factor-loading analysis unit 705 rejects the cluster C2B and does not select a variable from the cluster C2B. When the number of variables to be selected is insufficient, the factor-loading analysis unit 705 selects the second outermost variable from the cluster having the largest number of variables. For example, the factor-loading analysis unit 705 selects the second variable X1 from the cluster C1B. In this manner, the variable selected by the factor-loading analysis unit 705 is a recommended variable (to be described later).

The label determination unit 706 performs label determination. Specifically, for example, the label determination unit 706 refers to the label designation table 500 shown in FIG. 5 and determines whether each variable is a controllable factor. When a variable is a controllable factor, the label determination unit 706 preferentially selects the variable corresponding to the factor. Specifically, for example, the label determination unit 706 selects a variable to which the priority label 503 of the label designation table 500 shown in FIG. 5 is set. In the example of FIG. 5, the variables X1, X4, X5, and X7 are selected.

The variable determination unit 707 performs variable determination. Specifically, for example, the variable determination unit 707 refers to the designated-variable table 600 shown in FIG. 6 and calculates an agreement rate. The agreement rate is a rate obtained when the number of designated variables including the item to which the designation label is added in the designated-variable table 600 is the denominator and the number of recommended variables selected by the factor-loading analysis unit 705 is the numerator.

The variable selection unit 708 performs variable selection. Specifically, for example, the variable selection unit 708 selects a variable by operating the input device 203. In addition, the variable selection unit 708 outputs the variable selection result and the agreement rate, and displays them on the screen.

FIG. 15 is an explanatory diagram showing an example of a variable-selection-result output screen. A variable-selection-result output screen 1500 displays the variable 501, the variable attribute 502, a cluster 1000, the designation label 603, the priority label 503, a recommended label 1501, and a selection label 1502. The recommended label 1501 stores a label indicating whether each variable is selected by the factor-loading analysis unit 705. FIG. 15 shows that the variables X1, X2, X5, X7, and X8 are selected by the factor-loading analysis unit 705. That is, the variables X1, X2, X5, X7, and X8 are recommended variables. The selection label 1502 stores a label indicating whether each variable is selected by the variable selection unit 708. The variable-selection-result output screen 1500 is the selection variable list 107 shown in FIG. 7.

Figure 16:
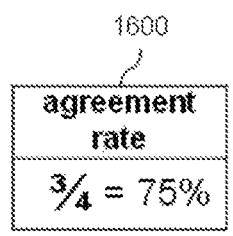
FIG. 16 is an explanatory diagram showing an example of an agreement-rate output screen.

FIG. 16 is an explanatory diagram showing an example of an agreement-rate output screen. An agreement-rate output screen 1700 displays an agreement rate. In the example of FIG. 15, the designated variables are four variables of X1, X2, X4, and X7. The recommended variables are five variables of X1, X2, X5, X7, and X8. The designated variables and the recommended variables are three variables of X1, X2, and X7. Thus, the agreement rate is ¾=75%.

The user can compare the recommended variables with the designated variables and change them as selection variables. For example, the variable X5 (Electric Power 2) is selected as "Recommended", and the variable X4 (Electric Power 1) is not selected. If the clusters 1000 have the same cluster number, the variables can be regarded to be similar, and the user is only required to select either the variable X4 or the variable X5 which belonging to the same cluster number 1. If the variable X4 designated as "Essential" is a normal monitoring target and is a variable familiar to the user, it is possible to reject the variable X5 and select the variable X4.

FIG. 17 is an explanatory diagram showing another example of the variable-selection-result output screen 1500. FIG. 17 shows that the variable-selection-result output screen 1500 is filtered. As the variables 501 increase, it becomes difficult to examine the output result on one screen. When any one of filtering buttons of respective fields of FIG. 15 is pressed, the result sorted by the field of the pressed filtering button. FIG. 17 shows that the cluster numbers are sorted by pressing the filtering button of the cluster 1000 in FIG. 15. To examine the clusters 1000, by filtering the clusters 1000, it is possible to compare and evaluate variable attributes and labels of similar variables in the same cluster.

Example of Variable Selection Processing Procedure

Figure 18:
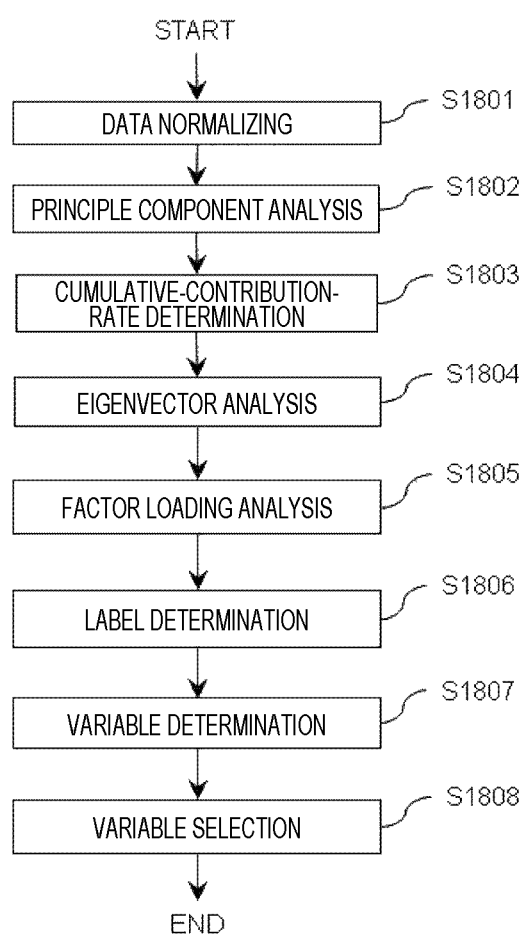
FIG. 18 is a flowchart showing an example of a variable selection processing procedure by the selection apparatus.

FIG. 18 is a flowchart showing an example of a variable selection processing procedure performed by the selection apparatus 101. The selection apparatus 101 performs data normalizing processing with the data normalizing processing unit 701 (step S1801), and principal component analysis with the principal-component analysis unit 702 (step S1802). The selection apparatus 101 further performs cumulative-contribution-rate determination with the cumulative-contribution-rate determination unit 703 (step S1803), and eigenvector analysis with the eigenvector analysis unit 704 (step S1804). The selection apparatus 101 further performs factor loading analysis with the factor-loading analysis unit 705, and label determination with the label determination unit 706. The selection apparatus 101 further performs variable determination with the variable determination unit 707, and variable selection with the variable selection unit 708.

Figure 19:
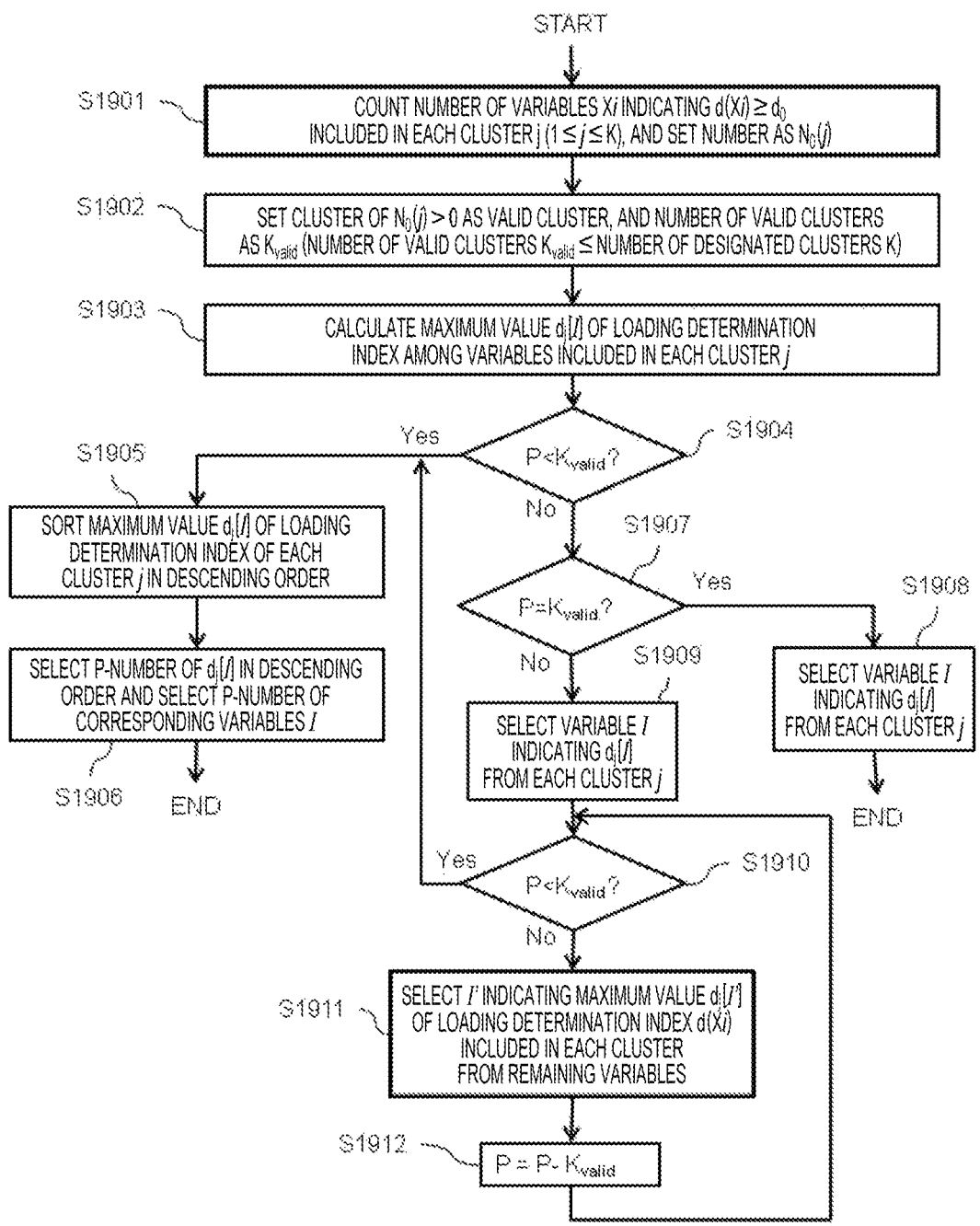
FIG. 19 is a flowchart showing an example of a detailed processing procedure for selecting variables by eigenvector-clustering in factor loading analysis (step S1805) shown in FIG. 18.

FIG. 19 is a flowchart showing an example of a detailed processing procedure for selecting variables by eigenvector clustering in factor loading analysis (step S1805) shown in FIG. 18. In FIG. 19, it is assumed that the number of variables is M, the number of selected variables is P, the loading-determination reference value is d0, the loading determination index for a certain variable Xi ($1 \leq i \leq M$) is d(Xi), and the number of clusters is K.

First, the selection apparatus 101 calculates the number of variables greater than or equal to the loading-determination reference value d0 among the variables included in each cluster j ($1 \leq j \leq K$), counts the number of variables Xi indicating d(Xi)$\geq$d0 included in each cluster j, and set the number as N0(j) (step S1901).

The selection apparatus 101 sets the cluster of N0(j)>0 including one or more variables as a valid cluster, and the number of the valid clusters as Kvalid (step S1902). However, it is assumed that the number of valid clusters Kvalid$\leq$the number of clusters K. Next, the selection apparatus 101 calculates the maximum value dj[I] of the loading determination index among the variables included in each valid cluster (step S1903).

The selection apparatus 101 determines whether the number of variable selections P is less than the number of the valid clusters Kvalid (step S1904).

If the number of variable selections is less (step S1904: Yes), the selection apparatus 101 sorts the maximum value dj[I] of the loading determination index of each cluster j in descending order (step S1905), and selects a variable XI from each of the P clusters in descending order (step S1906). Thus, the variable selection by eigenvector clustering is completed.

On the other hand, when the number of variable selections is not less (step S1904: No), the selection apparatus 101 determines whether the number of variable selections P matches the number of the valid clusters Kvalid (step S1907).

In these numbers match (step S1907: Yes), the selection apparatus 101 selects one variable XI indicating the maximum value dj[i] of the loading determination index of each cluster j (step S1908). Thus, the variable selection by eigenvector clustering is completed.

On the other hand, when these numbers do not match (step S1907: No), which means that the number of variable selections P is greater than the number of the valid clusters Kvalid. Thus, the selection apparatus 101 selects one variable XI indicating the maximum value dj[I] of the loading determination index of each cluster j (step S1909).

Then, similarly to step S1904, the selection apparatus 101 determines whether the number of variable selections P is less than the number of the valid clusters Kvalid (step S1910).

When the number of variable selections P is not less (step S1910: No), the selection apparatus 101 selects the variable XI' indicating the maximum value dj[I'] of the loading determination index d(Xi) included in each cluster from the unselected remaining variables (step S1911). Then, the selection apparatus 101 subtracts the number of the valid clusters Kvalid from the number of variable selections P to update the number of variable selections P (step S1912), and returns to step S1910.

When the number of variable selections P is less (step S1910: Yes), the processing proceeds to step S1905, and the selection apparatus 101 selects the remaining P variables.

Figure 20:
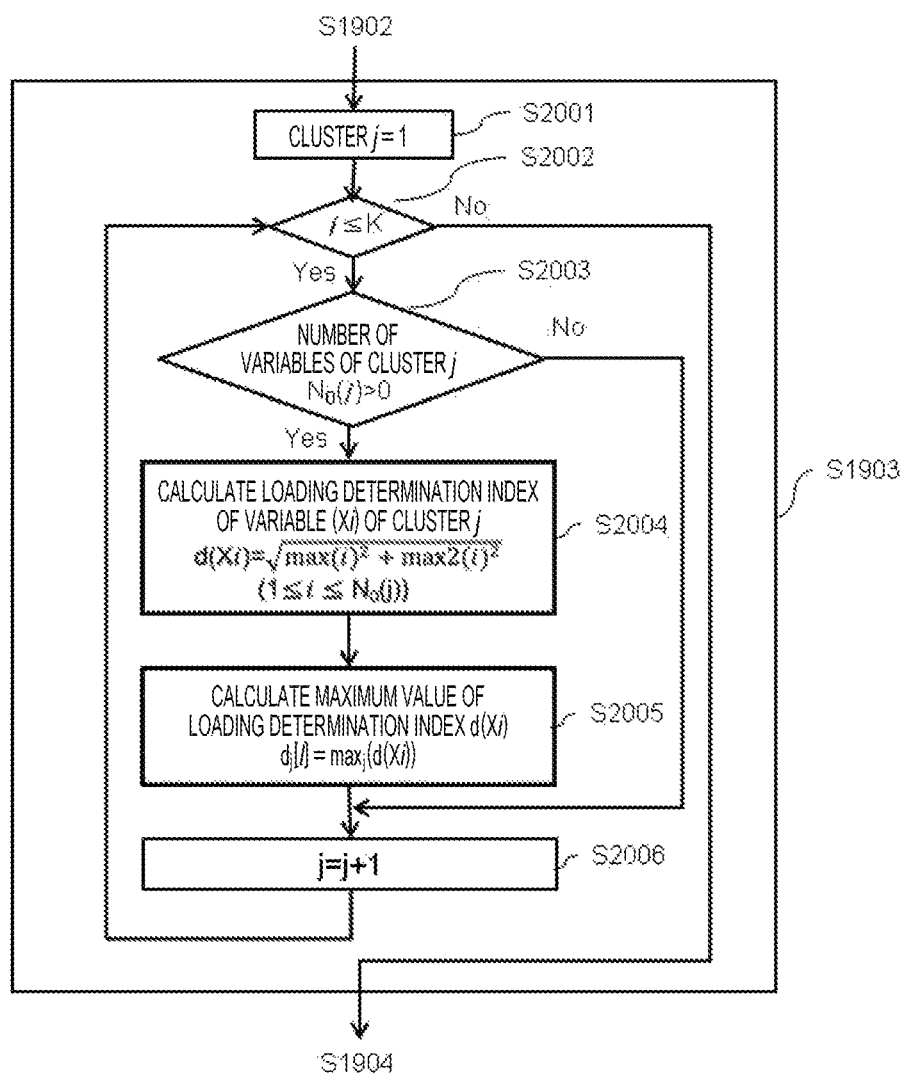
FIG. 20 is a flowchart showing an example of a processing procedure for calculating the maximum value dj[I] of a loading determination index in step S1903 shown in FIG. 19.

FIG. 20 is a flowchart showing an example of a processing procedure for calculating the maximum value dj[I] of the loading determination index in step S1903 shown in FIG. 19. The selection apparatus 101 sets the cluster j as j=1 (step S2001) and determines whether j$\leq$K is satisfied (step S2002). When j$\leq$K is satisfied (step S2002: Yes), the selection apparatus 101 determines whether the number of variables N0(j) of the cluster j satisfies N0(j)>0 when j K is satisfied (step S2002: Yes).

When N0(j)>0 is not satisfied (step S2003: No), that is, when the number of variables N0(j) of the cluster j is 0, the selection apparatus 101 increments j (step S2006), and returns to step S2002.

On the other hand, when N0(j)>0 is satisfied (step S2003: Yes), the selection apparatus 101 calculates the loading determination index d(Xi) of the variable Xi of the cluster j (step S2004). However, i is $1 \leq i \leq N0(j)$. Then, the selection apparatus 101 calculates the maximum value of the loading determination index d(Xi), that is dj[I]=max(d(Xi)) (step S2005). Then, the selection apparatus 101 increments j (step S2006) and returns to step S2002. In step S2002, when j$\leq$K is not satisfied (step S2002: No), the processing proceeds to step S1904.

Note that, in the factor loading analysis described above, the plotting object of the factor loading map 1200 may be the first principal component and the second principal component. According to the cumulative contribution rate, the components up to the fifth principal component are adopted in the cumulative-contribution-rate determination.

Figure 21:
FIG. 21 is an explanatory diagram showing another example of the factor-loading cluster table.

FIG. 21 is an explanatory diagram showing another example of the factor-loading cluster table 750. A factor-loading cluster table 750 includes the variable 501, the factor loadings 1101 to 1105 of the first principal component PC1 to the fifth principal component PC5 in the input data groups 105, the cluster number 1000, and a loading determination index 2100. The value d of the loading determination index 2100 (hereinafter, a loading determination index d) is the length of a vector having the values of the first principal component PC1 to the fifth principal component PC5 as elements.

It is assumed that the loading determination index of the variable Xi is d(Xi), the factor loading corresponding to the first principal component PC1 is PC1$i$, the factor loading corresponding to the second principal component PC2 is PC2$i$, the factor loading corresponding to the third principal component PC3 is PC3$i$, the factor loading corresponding to the fourth principal component PC4 is PC4$i$, and the factor loading corresponding to the fifth principal component PC5 is PC5*i*. The loading determination index d(Xi) of the variable Xi is expressed by the following formula.

$$d(Xi) = \sqrt{(PC1i^2 + PC2i^2 + PC3i^2 + PC4i^2 + PC5i^2)}$$

Figure 22:
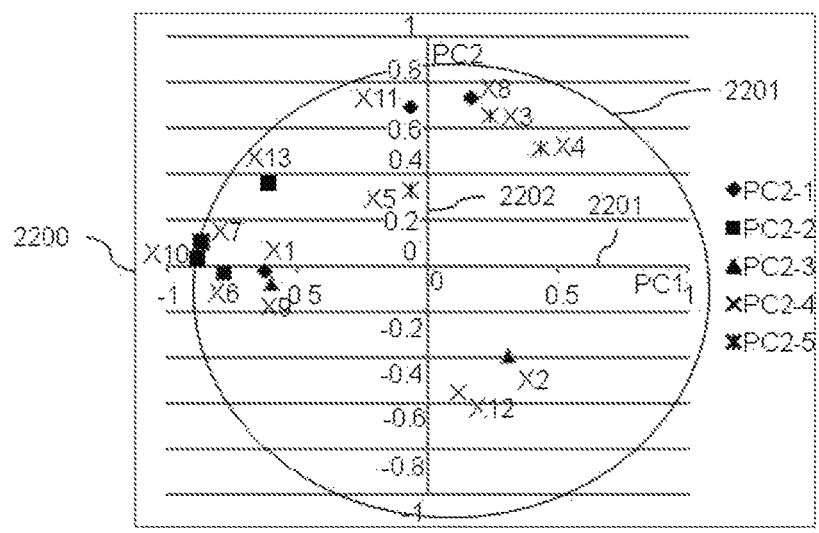
FIG. 22 is an explanatory diagram showing another example of the factor loading map.

FIG. 22 is an explanatory diagram showing another example of the factor loading map. In a factor loading map 2200, the first principal component is set as a horizontal axis 2201, and the second principal component is set as a vertical axis 2202. In the factor loading map 2200, the factor loading which is the value of the first principal component (PC1) 1101 of each variable and the factor loading which is the value of the second principal component (PC2) 1102 are plotted. A circle 2203 is a circle having a radius of 1. The first principal component (PC1) 1101 has a characteristic of a variable close to the value 1 or −1 of the horizontal axis 2201 crossing the circle 2203. The second principal component has a characteristic of a variable close to the value 1 or −1 of the vertical axis 2202 crossing a semicircle 2203.

Figure 23:
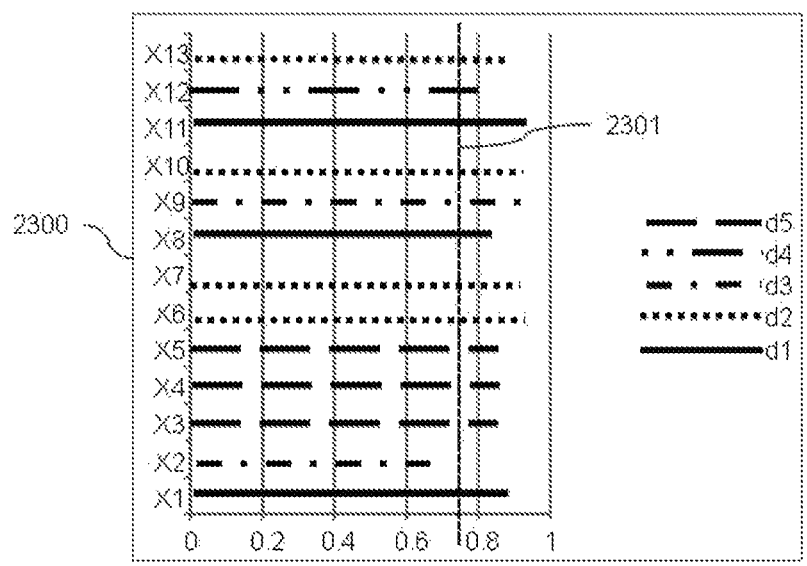
FIG. 23 is an explanatory diagram showing an example of a graph showing a load determination index of each variable shown in FIG. 22.

FIG. 23 is an explanatory diagram showing an example of a graph showing the load determination index dk (k is the cluster number) of each of the variables X1 to X13 shown in FIG. 22. In a graph 2300, the load determination indexes d1 to d5 are the distances from the origin (0, 0) of the factor loading map 2200 to the variables X1 to X13 belonging to the corresponding clusters. A broken line 2301 is the loading determination index threshold. By moving the broken line 2301 to the left or right with the input device 203, the loading determination index threshold can be changed. By changing the loading determination index threshold, the number of variables to be selected can be changed. For example, among the variables belonging to each cluster, the variable greater than the threshold and having the maximum value is selected.

As described above, the selection apparatus according to the present embodiment generates a plurality of clusters by clustering a representative data group representing a variable for each of a plurality of data groups corresponding to a plurality of variables based on similarity of the representative data group. Here, the plurality of data groups is, for example, the above input data groups 105. Each data group of the plurality of data groups corresponds to each variable. The representative data is, for example, a set of the elements of the first principal components PC1 to PC5 shown in FIG. 10, that is, an eigenvector. In the present embodiment, as described above, the representative data is determined by narrowing the first principal component PC1 to the thirteenth principal component PC15 to the first principal components PC1 to PC5 by the eigenvalue table 901 shown in FIG. 9.

The selection apparatus generates the factor loading map 1200 by plotting the representative data group on a coordinate plane constituted by a first axis related to a first component defining a first characteristic of each piece of data of the representative data group (the horizontal axis of the factor loading map 1200) and a second axis related to a second component defining a second characteristic (the vertical axis of the factor loading map 1200). In the example described above, the first characteristic is, for example, the maximum value of the factor loadings 1101 to 1105 of the first principal component PC1 to the fifth principal component PC5. The second characteristic is the second maximum value of the factor loadings 1101 to 1105 of the first principal component PC1 to the fifth principal component PC5. The first component is the principal component for the factor loading having the maximum value and the second component is the principal component for the factor loading having the second maximum value.

The selection apparatus selects, by selecting specific representative data from among one or more pieces of representative data belonging to each cluster, a specific variable represented by the specific representative data based on the circle 1202 having the center at the origin (0, 0) of the factor loading map 1200.

Accordingly, it is possible to mechanically and easily select several tens to several hundreds of appropriate variables when a large number of variables of thousands to tens of thousands are given.

In the above embodiment, the selection apparatus selects the variable indicating the maximum value outside the circle on the factor loading map. However, when more appropriate variables are indicated as the components of the vertical axis and the horizontal axis are smaller, the selection apparatus is to select the variable indicating the minimum value inside the circle.

In addition, by using the label designation table 500 as priority information specifying one or more variables to be prioritized from among a plurality of variables, the selection apparatus 101 selects variables so as to include the variables preferentially specified in the label designation table. Accordingly, it is possible to preferentially select variables.

Furthermore, by using the designated-variable table 600 as designation information designating one or more variables from among a plurality of variables, the rate indicating how many specific variables are included in the designated variables (agreement rate) is calculated. Thus, by presenting the validity of variable selection based on past experience knowledge such as business knowledge, and it is possible to easily select variables for analysis such as abnormality determination by condition classification by decision tree analysis or by a support vector machine (SVM). For example, by adding a designation label to a variable selected in the past in the designated-variable table 600, it is possible to confirm the agreement rate with the past history.

Furthermore, by linking the radius of the circle of the factor loading map 1200 (2200) with the threshold of the graph 1300 (2300), it is possible to improve convenience for the user.

Moreover, the selection apparatus 101 converts, by principle component analysis using a plurality of observation data groups from a plurality of observation targets, the plurality of observation data groups corresponding to the variable into the data group constituted by a plurality of components including the first component and the second component. The selection apparatus 101 generates the plurality of clusters by clustering, for each converted data group, the representative data group representing the variable based on the similarity of the representative data group. In this manner, if the data is converted, it is possible to easily and appropriately select variables. Thus, it is possible to drastically reduce the man-hours for analysis and variable selection which requires analysts' skills and business knowledge, and takes time.

Note that, the present invention is not limited to the above embodiment, and includes various modifications and equivalent configurations within the scope of the appended claims. For example, the above embodiment has been described in detail in order for the present invention to be easily understood, and the present invention is not necessarily limited to those having all the described configurations. In addition, a part of the configuration of an embodiment may be replaced by the configuration of another embodiment. Furthermore, the configuration of another embodiment may be added to the configuration of an embodiment. Moreover, other configurations may be added, deleted, or replaced with respect to a part of the configuration of each embodiment.

In addition, the above configurations, functions, processing units, processing means, and the like may be implemented by hardware by, for example, designing some or all of them in an integrated circuit or the like, or may be implemented by software by a processor interpreting and executing programs for the respective functions.

Information such as programs, tables, and files that implement the functions can be stored in a recording device such as a hard disk, or a solid state drive (SSD), or a recording medium such as an integrated circuit (IC) card, an SD card, or a digital versatile disc (DVD).

Note that, control lines and information lines considered to be necessary for the description are shown, and all control lines and information lines in implementation are not necessarily shown. In practice, it can be considered that almost all the configurations are mutually connected.

The invention claimed is:

1. A selection apparatus that selects a variable which is a range of possible values of a data group from an observation target, the apparatus comprising:
a processor configured to execute a program; and
a storage device configured to store the program, wherein
the processor generates a plurality of clusters by clustering a representative data group representing the variable for each of a plurality of the data groups corresponding to a plurality of the variables based on similarity of the representative data group, generates a map by plotting the representative data group on a coordinate plane constituted by a first axis related to a first component defining a first characteristic of each piece of data of the representative data group and a second axis related to a second component defining a second characteristic, and selects, by selecting specific representative data from among one or more pieces of representative data belonging to each of the plurality of clusters, a specific variable represented by the specific representative data based on a circle having a center at an origin of the map.

2. The selection apparatus according to claim 1, wherein
the first component and the second component each have a characteristic of being worth to be selected as being farther away from the origin, and
the processor selects, at the outside of the circle, representative data farthest from the origin from among the one or more pieces of representative data belonging to each of the plurality of clusters as the specific representative data.

3. The selection apparatus according to claim 1, wherein
the first component and the second component each have a characteristic of being worth to be selected as being closer to the origin, and
the processor selects, at the inside of the circle, representative data closest to the origin from among the one or more pieces of representative data belonging to each of the plurality of clusters as the specific representative data.

4. The selection apparatus according to claim 1, wherein
the storage device stores priority information specifying one or more variables to be prioritized from among the plurality of variables, and
the processor selects, based on the circle having the center at the origin of the map, representative data related to a variable specified by the priority information from among the one or more pieces of representative data belonging to each of the plurality of clusters as the specific representative data.

5. The selection apparatus according to claim 1, wherein
the storage device stores designation information designating one or more variables from among the plurality of variables, and
the processor calculates, based on the circle having the center at the origin of the map, an agreement rate of the variable based on the number of pieces of representative data related to a variable specified by the designation information and the number of pieces of the specific representative data among the one or more pieces of representative data belonging to each of the plurality of clusters.

6. The selection apparatus according to claim 1, wherein the processor generates a bar graph indicating a distance between the origin and the representative data, and a threshold of the distance corresponding to the radius of the circle for each of the representative data group on the map, and changes, in conjunction with change of the magnitude of either one of the radius of the circle or the threshold, the magnitude of the other.

7. The selection apparatus according to claim 1, wherein the processor converts, by principle component analysis using a plurality of observation data groups from a plurality of the observation targets, the plurality of observation data groups corresponding to the variable into the data group constituted by a plurality of components including the first component and the second component, and generates the plurality of clusters by clustering, for each of the plurality of converted data groups, the representative data group representing the variable based on the similarity of the representative data group.

8. A selection method by a selection apparatus that selects a variable which is a range of possible values of a data group from an observation target, the apparatus including a processor that executes a program and a storage device that stores the program, the selection method comprising:
generating, by the processor, a plurality of clusters by clustering a representative data group representing the variable for each of a plurality of the data groups corresponding to a plurality of the variables based on similarity of the representative data group;
generating, by the processor, a map by plotting the representative data group on a coordinate plane constituted by a first axis related to a first component defining a first characteristic of each piece of data of the representative data group and a second axis related to a second component defining a second characteristic; and
selecting, by the processor, by selecting specific representative data from among one or more pieces of representative data belonging to each of the plurality of clusters, a specific variable represented by the specific representative data based on a circle having a center at an origin of the map.

9. A selection program for causing a processor to select a variable which is a range of possible values of a data group from an observation target, the processor executes:
generating a plurality of clusters by clustering a representative data group representing the variable for each of a plurality of the data groups corresponding to a plurality of the variables based on similarity of the representative data group;
generating a map by plotting the representative data group on a coordinate plane constituted by a first axis related to a first component defining a first characteristic of each piece of data of the representative data group and a second axis related to a second component defining a second characteristic; and selecting by selecting specific representative data from among one or more pieces of representative data belonging to each of the plurality of clusters, a specific variable represented by the specific representative data based on a circle having a center at an origin of the map.

* * * * *